(12) United States Patent
Van Hullebusch et al.

(10) Patent No.: US 11,277,969 B2
(45) Date of Patent: Mar. 22, 2022

(54) ADJUSTING SYSTEM FOR FINGERSTYLE GRATES OF AN AGRICULTURAL HARVESTER

(71) Applicant: CNH Industrial America LLC, New Holland, PA (US)

(72) Inventors: Bart G. L. Van Hullebusch, Knesselare (BE); Johan A. Van der Haegen, Gavere (BE)

(73) Assignee: CNH Industrial America LLC, New Holland, PA (US)

( * ) Notice: Subject to any disclaimer, the term of this patent is extended or adjusted under 35 U.S.C. 154(b) by 231 days.

(21) Appl. No.: 16/500,598

(22) PCT Filed: Mar. 30, 2018

(86) PCT No.: PCT/EP2018/058356
§ 371 (c)(1),
(2) Date: Oct. 3, 2019

(87) PCT Pub. No.: WO2018/185035
PCT Pub. Date: Oct. 11, 2018

(65) Prior Publication Data
US 2020/0196530 A1    Jun. 25, 2020

(30) Foreign Application Priority Data
Apr. 3, 2017   (BE) .................................. 2017/5232

(51) Int. Cl.
*A01F 12/28*   (2006.01)
*A01F 12/26*   (2006.01)
(Continued)

(52) U.S. Cl.
CPC .............. *A01F 12/28* (2013.01); *A01F 12/26* (2013.01); *A01D 41/1276* (2013.01);
(Continued)

(58) Field of Classification Search
CPC ........ A01F 12/28; A01F 12/26; A01F 12/181; A01F 12/448; A01F 7/067; A01D 41/1276
See application file for complete search history.

(56) References Cited

U.S. PATENT DOCUMENTS 489,724  A  *  1/1893  Watts ...................... A01F 12/28
                                                 460/109
873,719  A  *  12/1907  Closz ........................ B07B 1/12
                                                 209/394
(Continued)

FOREIGN PATENT DOCUMENTS

CH      243525 A    7/1946
DE      3832996 A1  4/1989
(Continued)

OTHER PUBLICATIONS

International Search Report for PCT application PCT/EP2018/058356, dated Jul. 6, 2018 (12 pages).

*Primary Examiner* — Arpad Fabian-Kovacs
(74) *Attorney, Agent, or Firm* — Peter Zacharias; Patrick Sheldrake

(57) ABSTRACT

A threshing system for use in an agricultural harvester. The threshing system includes a rotor and a perforated concave system. The rotor has a rotational axis. The perforated concave system is spaced radially outwardly from the rotor for passage of grain through perforations as the rotor moves crop material across the concave system. The concave system has at least one concave section having a rigid frame, pivotal members, and an arcuate movable member. The rigid frame has a plurality of sides rigidly coupled together. The pivotal members are pivotally coupled and extend to two of the sides of the rigid frame. The arcuate movable member interacts with the plurality of pivotal members to pivot each of the pivotal members as the arcuate movable member is moved along a segment of an arc generally about the rotational axis.

20 Claims, 11 Drawing Sheets

(51) Int. Cl.
  *A01F 12/18* (2006.01)
  *A01F 12/44* (2006.01)
  *A01F 7/06* (2006.01)
  *A01D 41/127* (2006.01)

(52) U.S. Cl.
  CPC ............. *A01F 7/067* (2013.01); *A01F 12/181* (2013.01); *A01F 12/448* (2013.01)

(56) References Cited

U.S. PATENT DOCUMENTS

| | | | |
|---|---|---|---|
| 941,037 A * | 11/1909 | Paschke | A01F 12/28 460/109 |
| 993,193 A * | 5/1911 | Pelican | A01F 12/26 460/107 |
| 1,191,853 A | 7/1916 | Thompson | |
| 1,269,109 A | 6/1918 | Noack | |
| 2,457,259 A | 12/1948 | Moll | |
| 3,537,459 A | 11/1970 | Thomas | |
| 6,802,771 B2 * | 10/2004 | Schwersmann | A01F 12/442 460/109 |
| 6,932,697 B2 * | 8/2005 | Baumgarten | A01D 41/1276 460/1 |
| 8,454,416 B1 | 6/2013 | Estes | |
| 10,609,867 B1 * | 4/2020 | Kile | A01F 12/28 |
| 10,905,050 B2 * | 2/2021 | Robertson | A01F 12/181 |
| 2003/0130019 A1 | 7/2003 | Mammen et al. | |
| 2004/0224737 A1 | 11/2004 | Esken et al. | |
| 2006/0128452 A1 * | 6/2006 | Esken | A01F 12/28 460/79 |

FOREIGN PATENT DOCUMENTS

FR 637181 A 4/1928
FR 2621216 A1 4/1989

* cited by examiner

ADJUSTING SYSTEM FOR FINGERSTYLE GRATES OF AN AGRICULTURAL HARVESTER

BACKGROUND OF THE INVENTION

The present invention relates to agricultural harvesters, and, more specifically to concave grate systems used with such harvesters.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Agricultural combines are expensive and have to be adaptable to harvest various grains under varying crop conditions in order to provide robust operation. This includes the need to adjust and redefine the operational characteristics of the threshing system.

What is needed in the art is a robust economical concave grate adjusting system.

SUMMARY OF THE INVENTION

The present invention provides adjustable grates for the concave system of agricultural harvesters.

The invention in one form is directed to a threshing system for use in an agricultural harvester, the threshing system including a rotor and a perforated concave system. The rotor is for the movement of crop material through the threshing system, with the rotor having a rotational axis. The perforated concave system is spaced radially outward from the rotor for the passage of grain through the perforations as the rotor moves the crop material across the concave system. The concave system has at least one concave section having a rigid frame, pivotal members, and an arcuate movable member. The rigid frame has a plurality of sides rigidly coupled together. The pivotal members are pivotally coupled to and extend to two of the sides of the rigid frame. The arcuate movable member interacts with the plurality of pivotal members to pivot each of the pivotal members as the arcuate movable member is moved along a segment of an arc generally about the rotational axis.

In another embodiment of the invention each of the pivotal members have at least one toothed section coupled proximate an end of the pivotal member.

In a further embodiment the arcuate member has a plurality of teeth that engage and interact with the toothed sections of each of the pivotal members.

In yet another embodiment the plurality of teeth on the arcuate member are arranged to correspond with each of the toothed sections of the pivotal members as a series of toothed sections separated by non-toothed sections along the arcuate movable member.

In still yet another embodiment the arcuate moveable member is constrained to move along one of the sides of the frame, with two of the sides being parallel.

In still yet another embodiment there are two arcuate movable members positioned along parallel opposing sides of the frame.

In still yet another embodiment each of the pivotal members have two toothed sections coupled proximate to opposite ends of the pivotal member.

In still yet another embodiment the eccentric member is rotationally coupled to the frame, with the eccentric member having an eccentric feature that interacts with an opening in the arcuate movable member to move the arcuate movable member as the eccentric member rotates in the frame.

In still yet another embodiment an actuator is coupled to the eccentric member to controllably rotate the eccentric member causing the arcuate movable member to move that causes each of the pivotal members to pivot.

In still yet another embodiment each of the pivotal members have a plurality of fingers extending therefrom.

In still yet another embodiment the actuator controls the orientation of the fingers so that they can extend inward from a circumferential arc relative to the rotational axis or outward from the circumferential arc.

In still yet another embodiment the frame has a plurality of slotted holes along two of the sides of the frame, with the pivoting members being inserted into corresponding sets of the slotted holes on each of the two sides of the frame, each of the slotted holes has a slot that extends to an edge of the side with the slot having an opening that is smaller than a diameter of the slotted hole.

In still yet another embodiment the pivotal members have at each end thereof a protrusion with a circular portion that corresponds with the diameter of the hole and a flat portion that narrows the breadth of the protrusion so as to allow the protrusions to pass through the breadth of the slotted holes when the pivotal members are being assembled to the frame.

In still yet another embodiment the eccentric member is two eccentric bars each interacting with the opening in opposite arcuate moveable members, the coupling member being slid over the two inner ends of the eccentric bars, the coupling member being secured to each of the eccentric bars to form the eccentric member.

An advantage of the present invention is that a fine control of the eccentric member moves the fingers of the concave bars in a coordinated manner inward or outward.

Another advantage is that the harvesting characteristics of the concave grates are changeable with the present invention.

Yet another advantage is that the pivotal members are held captive in their slotted holes while they move over their normal operating range.

A further advantage is that the pivotal members are easily removed from the slotted holes in the frame when the arcuate member is not engaged with the teeth of the pivotal members.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-aft direction of the agricultural harvester and are equally not to be construed as limiting.

Figure 1:
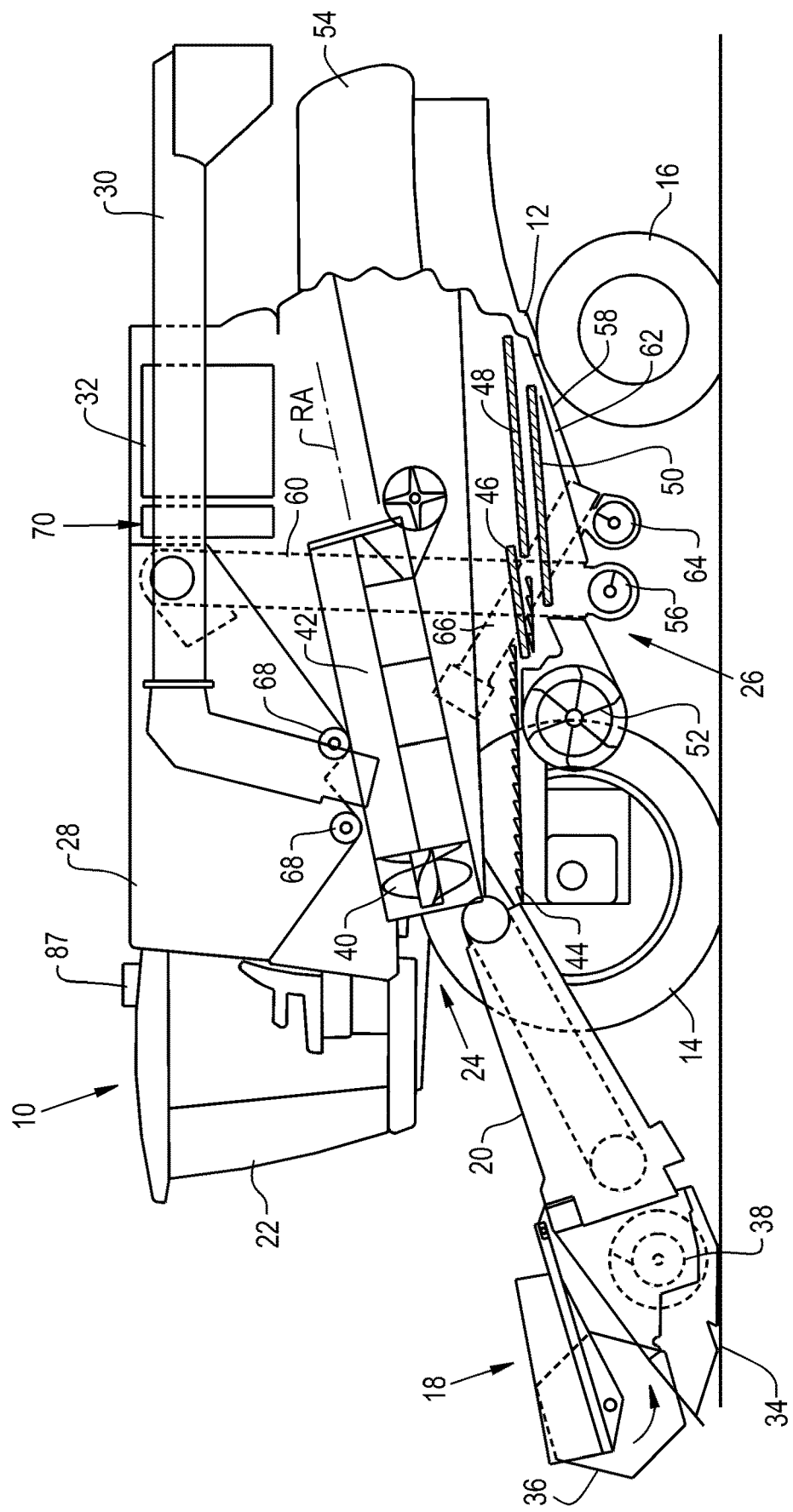
FIG. 1 is a side view of an embodiment of an agricultural harvester in the form of a combine, which includes an embodiment of a concave system of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable about an axis RA within a corresponding perforated concave system 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged grain elevator 60 for transport to grain tank 28. Tailings from cleaning system 26 fall to a tailings auger trough 58. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

Figure 2:
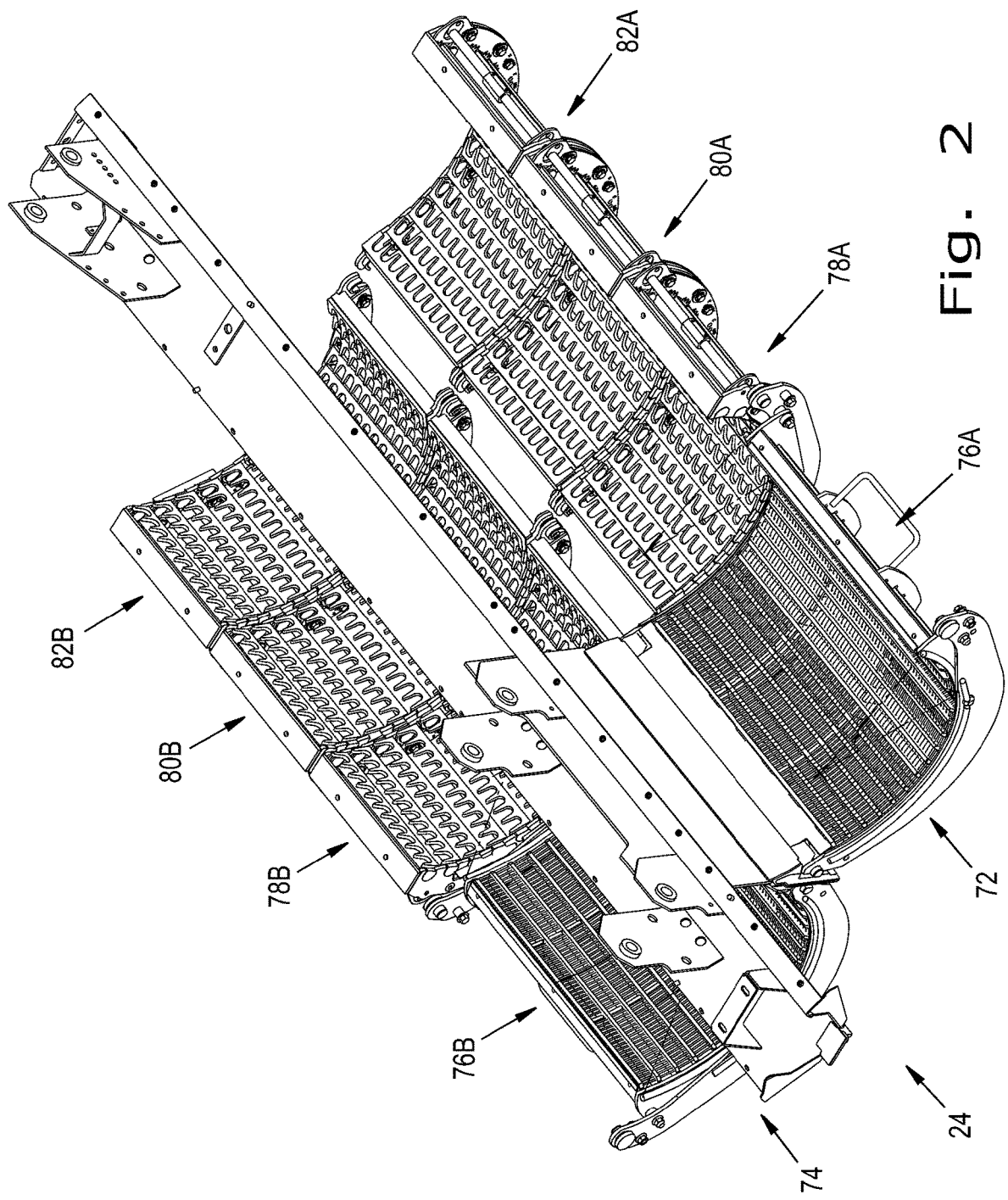
FIG. 2 is a perspective view of concave sections used in the harvester of FIG. 1.
Figure 3:
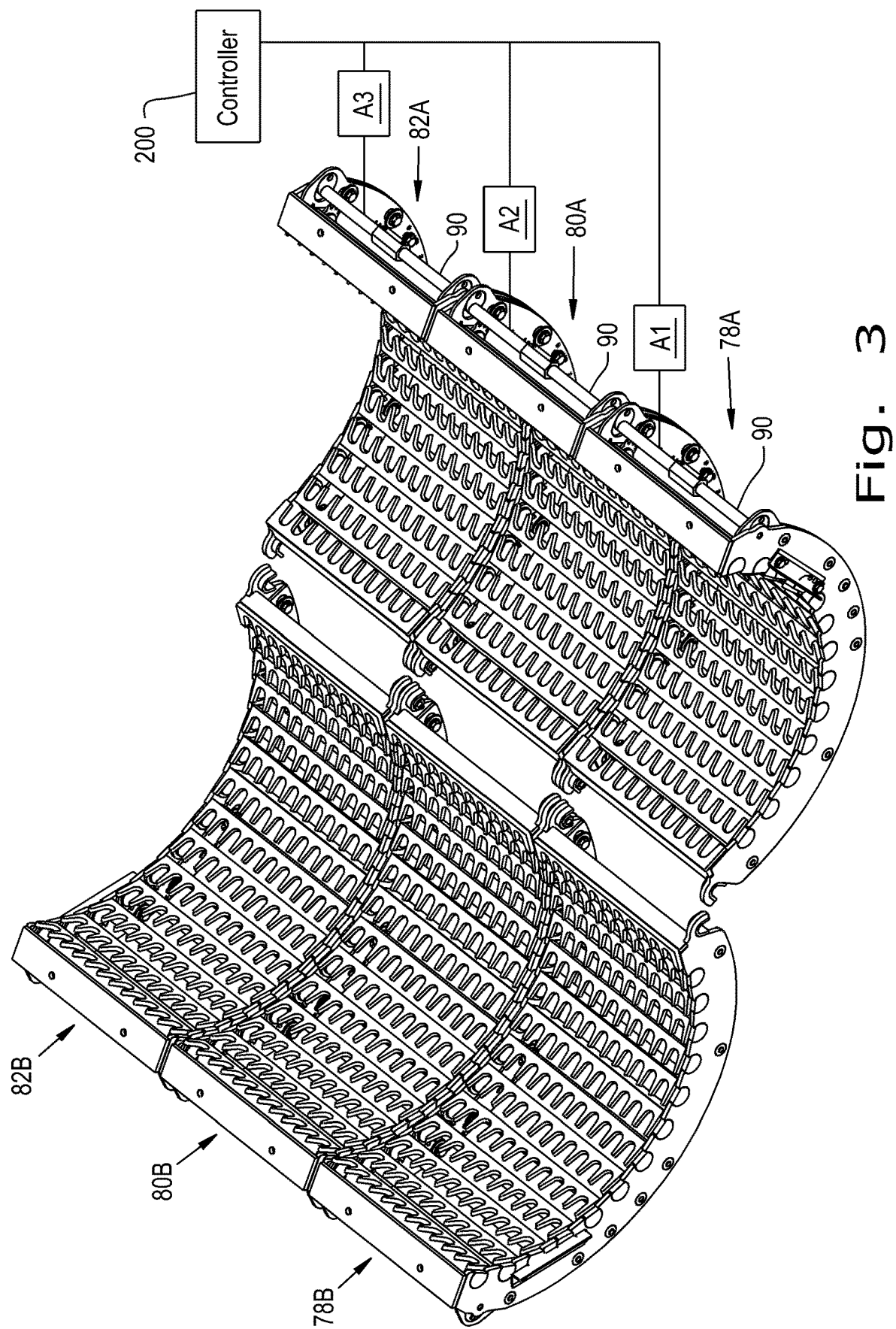
FIG. 3 is a perspective view of an embodiment of adjustable concaves of the concave sections shown in FIG. 2.

According to an aspect of the present invention, combine 10 includes concave systems 72 and 74 as illustrated in FIGS. 2 and 3 having fixed grate systems 76A and 76B respectively and adjustable grates 78A, 80A, 82A and 78B, 80B, 82B respectively. Concave systems 72 and 74 are illustrative of a dual rotor combine 10; however, it is also contemplated to use the inventive features of the present invention on single rotor harvesters having various orientations of the rotor 40 or on a conventional combine that uses a threshing drum with a concave or a rotating cylinder.

Figure 4:
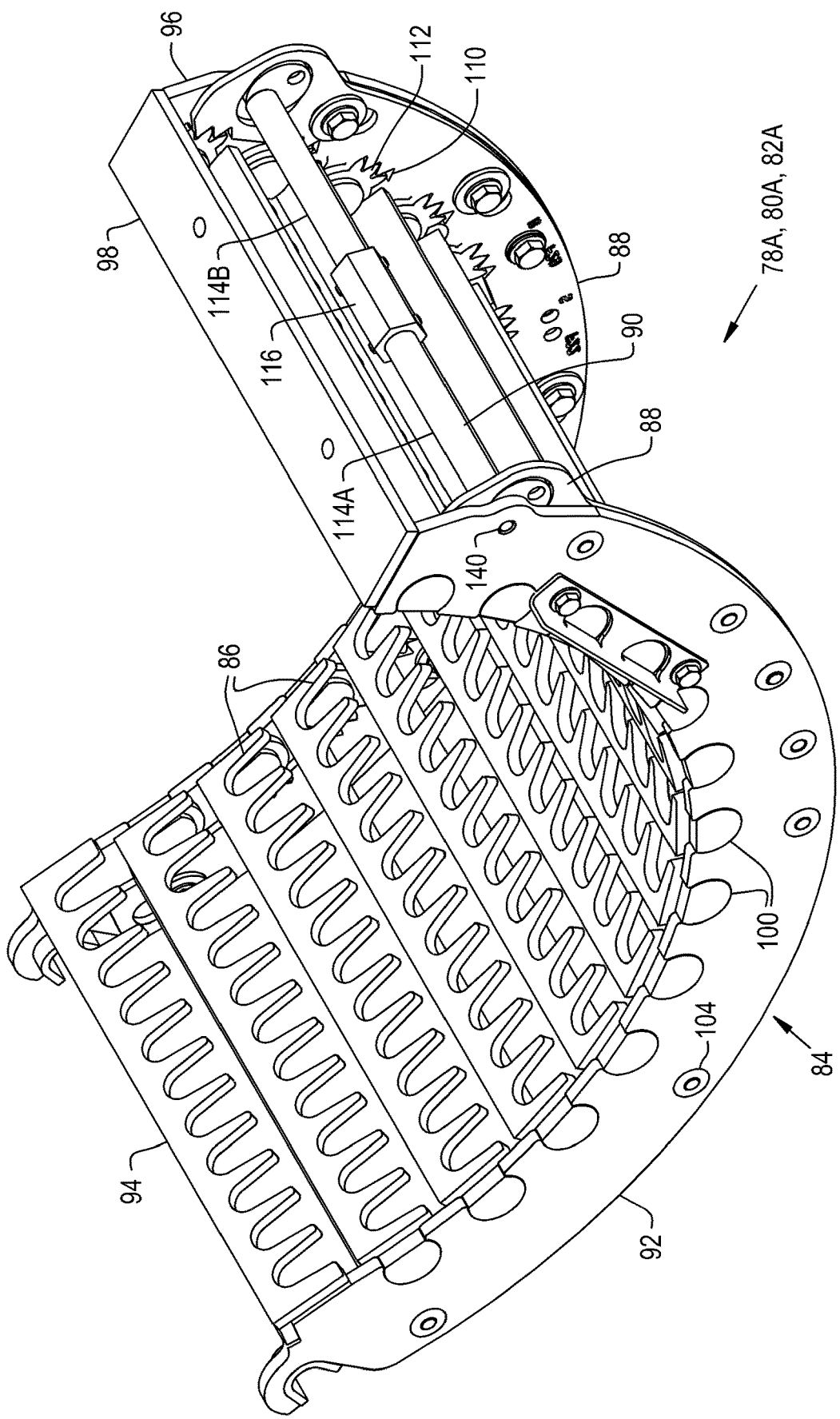
FIG. 4 is a perspective view of one adjustable concave shown in FIGS. 2 and 3.
Figure 5:
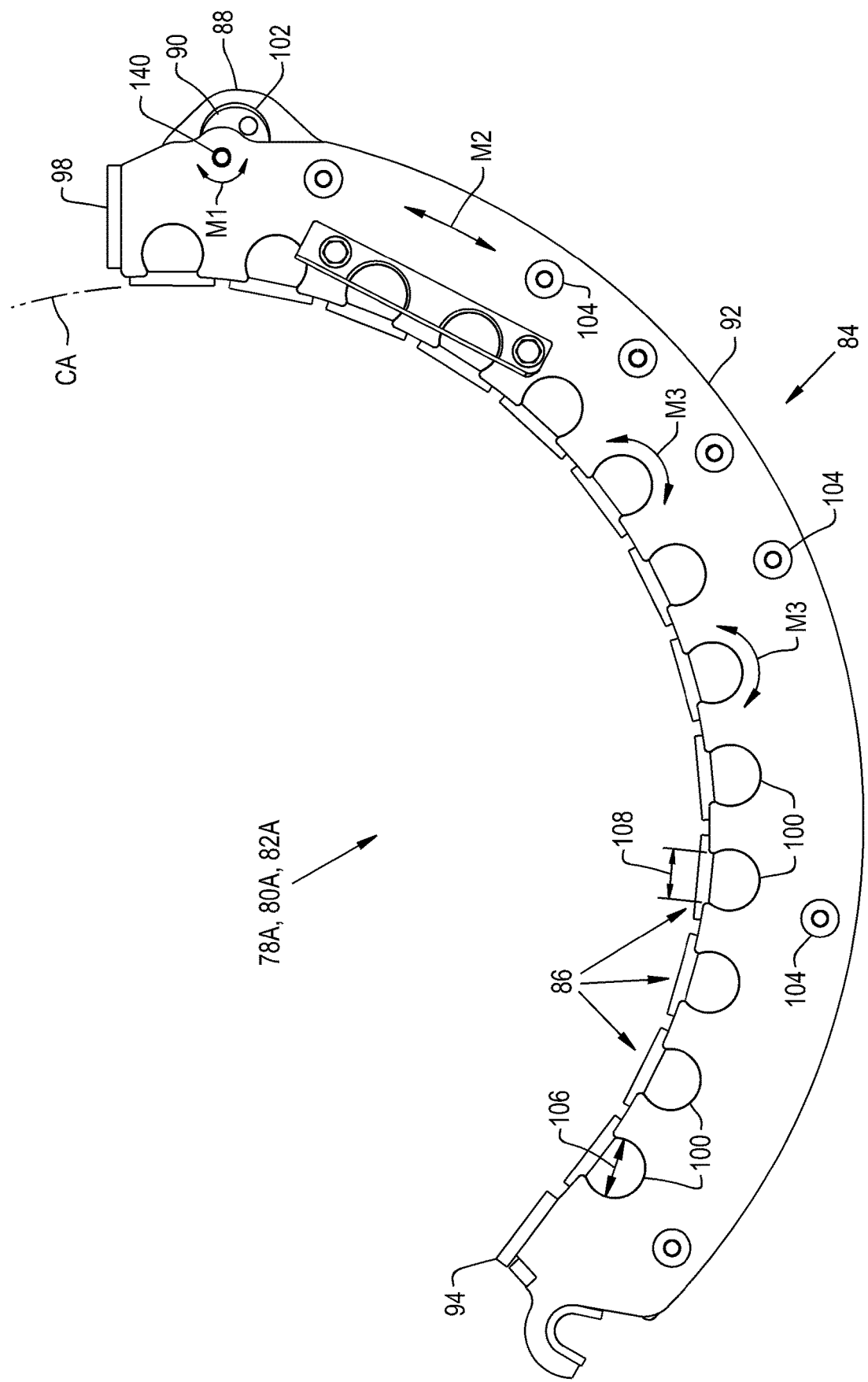
FIG. 5 is a front view of the concave of FIG. 4 with the pivotal finger members in a slotted position.

Now, additionally referring to FIGS. 4 and 5 there are shown further features and details of the adjustable grates 78A, 80A and 82A, which are representative of all of the adjustable grates illustrated herein. The adjustable grates 78A, 80A and 82A each include a frame 84, pivotal finger members 86, arcuate movable members 88 and an eccentric member 90. The eccentric member 90 is coupled to the arcuate movable members 88 so that the rotation of the eccentric member 90 by an actuator A1, A2 or A3 (shown schematically in FIG. 3), illustrated as motion M1, causes the arcuate movable members 88 to move along an arc, as illustrated as motion M2, which causes the pivotal members 86 to move as illustrated as motion M3. The actuators A1, A2, A3 are coupled to respective eccentric members 90 to cause a fine movement of the arcuate movable members 88 to accurately control the orientation of the pivotal members 86, under the control of a controller 200. It is also contemplated that a single actuator A1, A2, or A3 may accomplish the movement of each of the eccentric members 90 in grates 78A, 80A and 82A.

The frame 84 has sides 92, 94, 96 and 98, which are all welded together to form a rigid frame 84, although other method of joining sides 92, 94, 96 and 98 are also contemplated. Sides 92 and 96 are opposite each other and are substantially similar, and may be identical for the ease of manufacturing. Side 94 has a set of fingers extending therefrom and may be considered to be similar to the fingers of the pivotal members 86, but the fingers of the side 94 are fixed and do not pivot.

Figure 12:
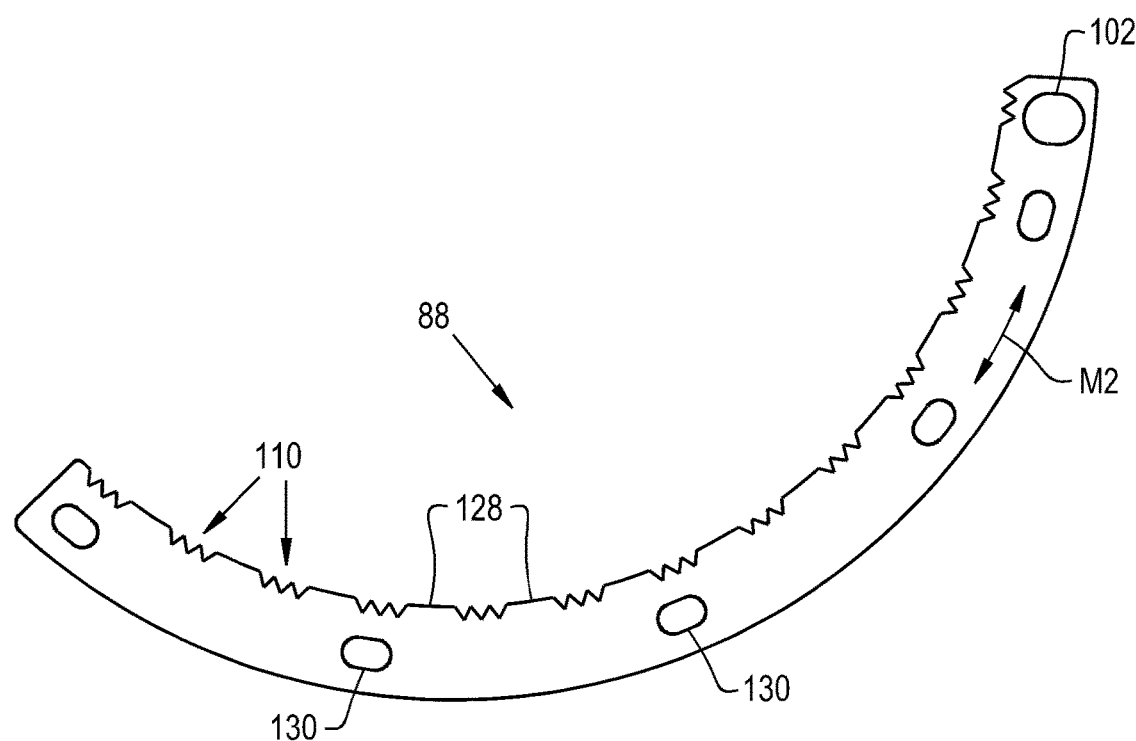
FIG. 12 is a side view of the arcuate movable members used in the concave sections of FIGS. 2-9.

Sides 92 and 96 have corresponding slotted holes 100 within which the pivoting members 86 are held captive as discussed herein. The movable arcuate members 88 each have a slot 102 within which a portion of the eccentric member 90 moves in M1 to result in motion M2 of arcuate members 88. Retaining members 104 extend through sides 92 and 96 and slots 130 (FIG. 12) of the arcuate movable members 88 allowing the arcuate movable members 88 to move in an arc segment generally relative to axis RA, the arc segment being represented by motion M2. The slotted holes 100 have a diameter 106 with the slot portion having a breadth 108, with the diameter 106 being larger than the breadth 108. This allows some corresponding features of the pivotal members 86 to be used to in the assembly of the grates 78A, 80A and 82A so that the pivotal members 86 are retained in the frame 84 without the need for separate retaining hardware, as discussed hereafter.

Along an inside edge of the arcuate movable members 88 there are gear teeth sections 110 that correspond to gear teeth 112 of the pivotal members 86 that allow the motion M2 to be translated into the motion M3. M2 also represents an arc segment, relative to rotor axis RA, along which arcuate movable member 88 moves. As illustrated, a number of teeth 112 of each of the pivotal members 86 can have a like number of corresponding receiving teeth 110.

The eccentric member 90 is made up of two eccentric bars 114A and 114B, which may be identical for the ease of manufacturing. A coupling 116 is slid over the ends of the eccentric bars 114A and 114B to assemble them into the eccentric member 90. The coupling 116 can have surface features that interact with the actuator A1, A2 or A3.

Figure 6:
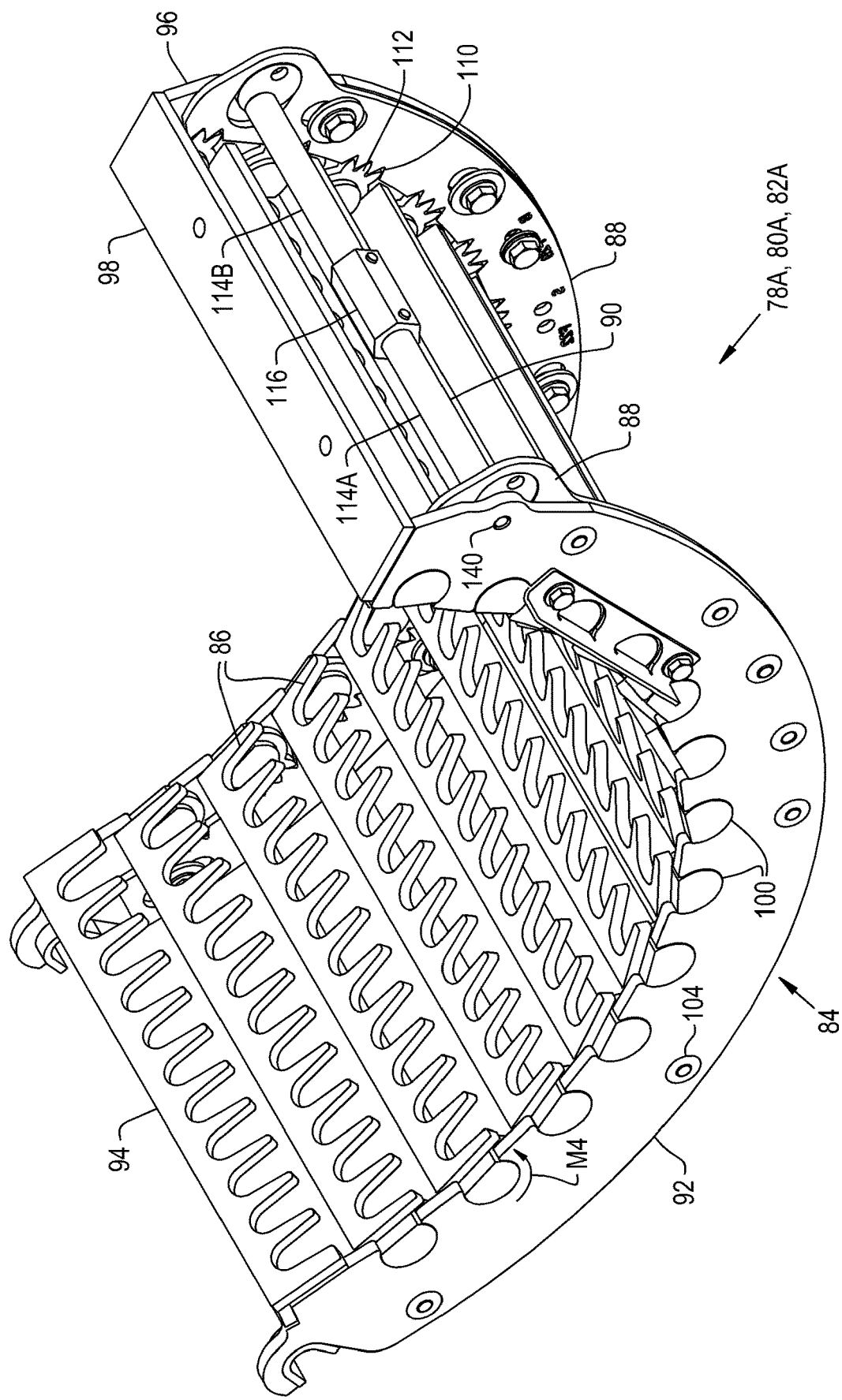
FIG. 6 is another perspective view of the concave sections of FIGS. 2-5 with the pivotal finger members in a finger style position.
Figure 7:
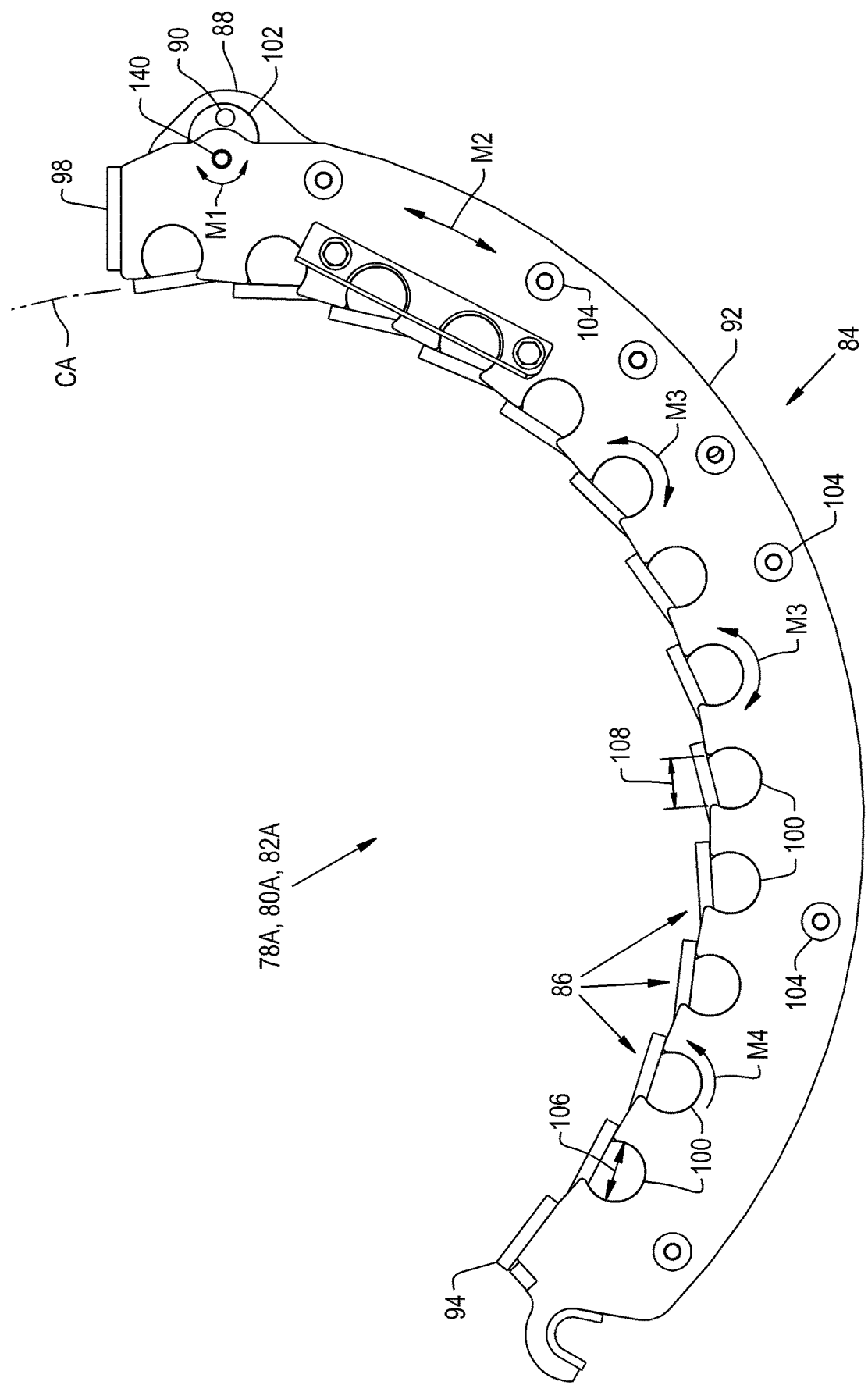
FIG. 7 is a front view of the concave of FIG. 6 with the pivotal finger members in a finger style position.
Figure 11:
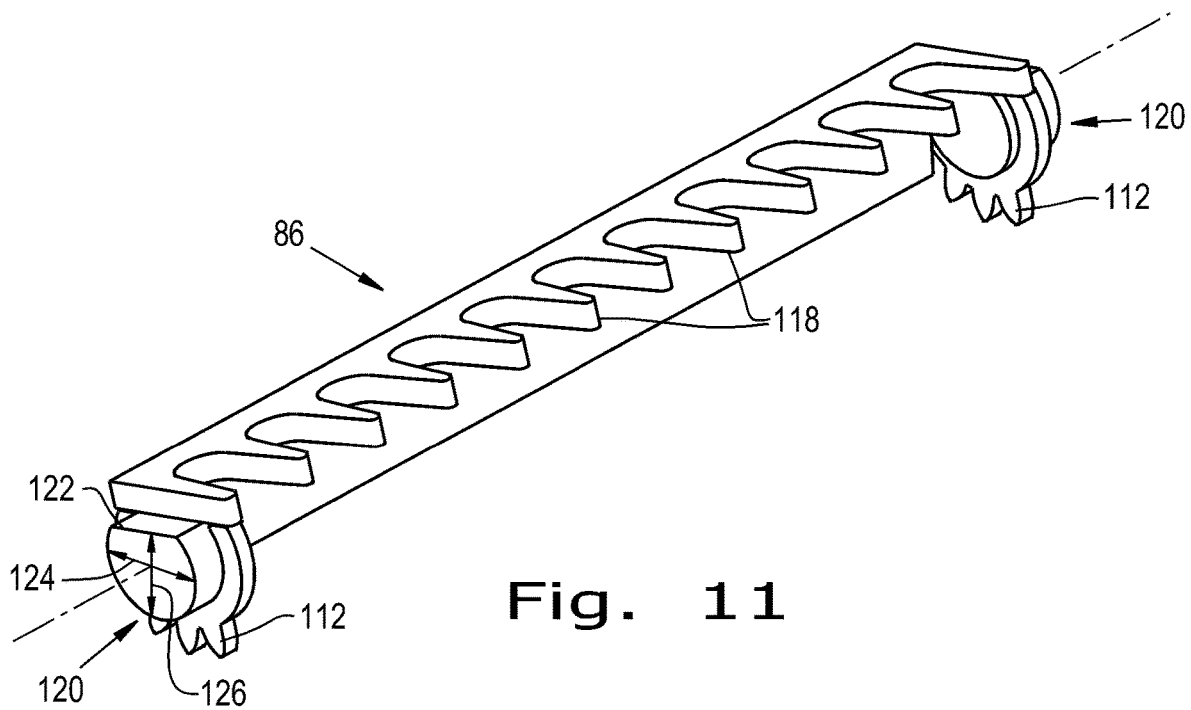
FIG. 11 is a perspective view of the pivotal finger members shown in FIGS. 2-9.

Now, additionally referring to FIGS. 6 and 7, there is illustrated the inward inclination of the fingers (118 as shown in FIG. 11) on the pivotal members 86 as a motion M4 is carried out by way of the actuator A1. The fingers are pivoted inward (toward axis RA) relative to their position as shown in FIG. 5. In FIG. 5 the inward facing surface of the pivotal members 86 are substantially aligned as a circumferential arc relative to axis RA. However, as seen in FIG. 7 the fingers are pivoted inward from the circumferential arc.

Figure 8:
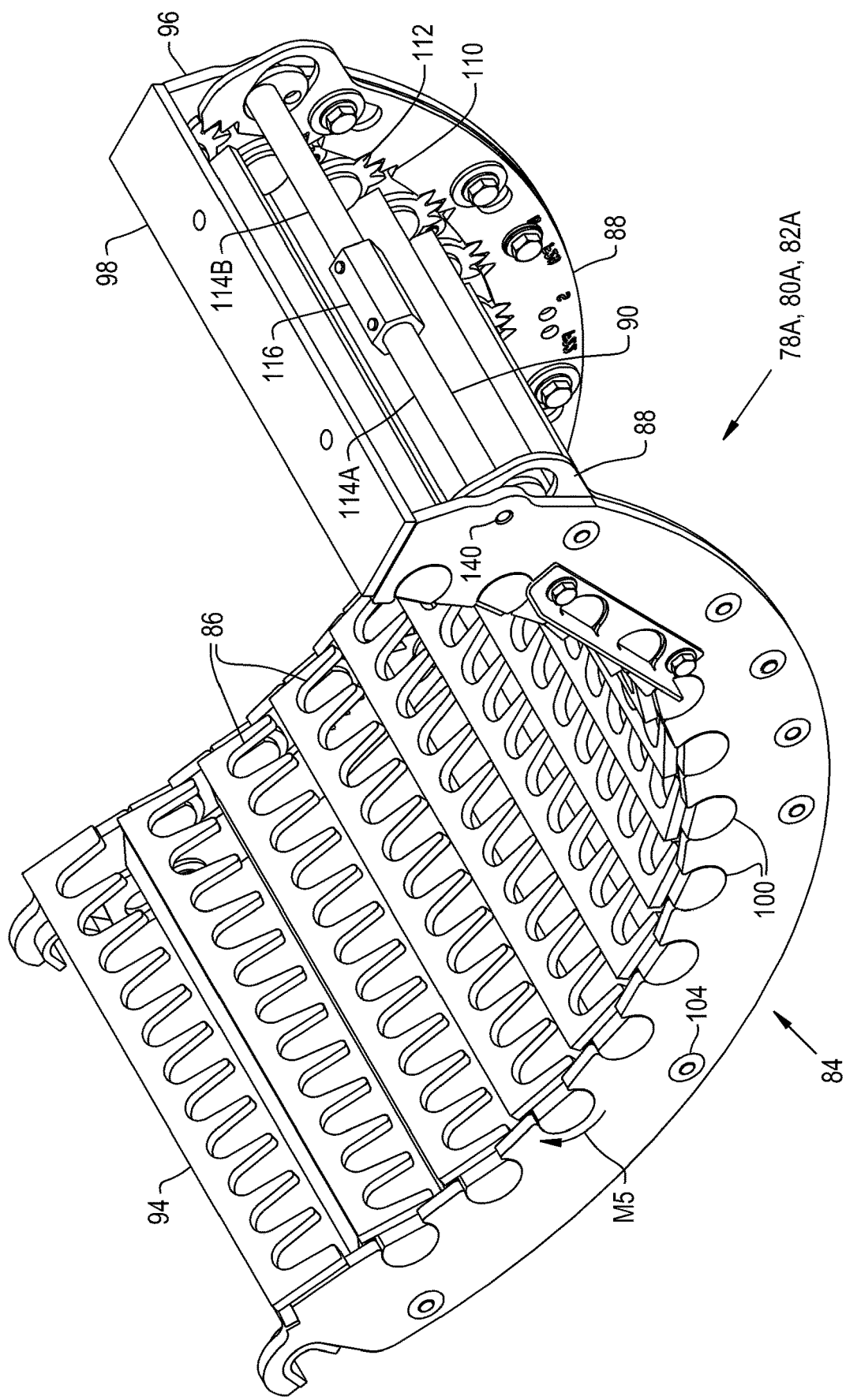
FIG. 8 is another perspective view of the concave sections of FIGS. 2-7 with the pivotal finger members in a bar/wire position.
Figure 9:
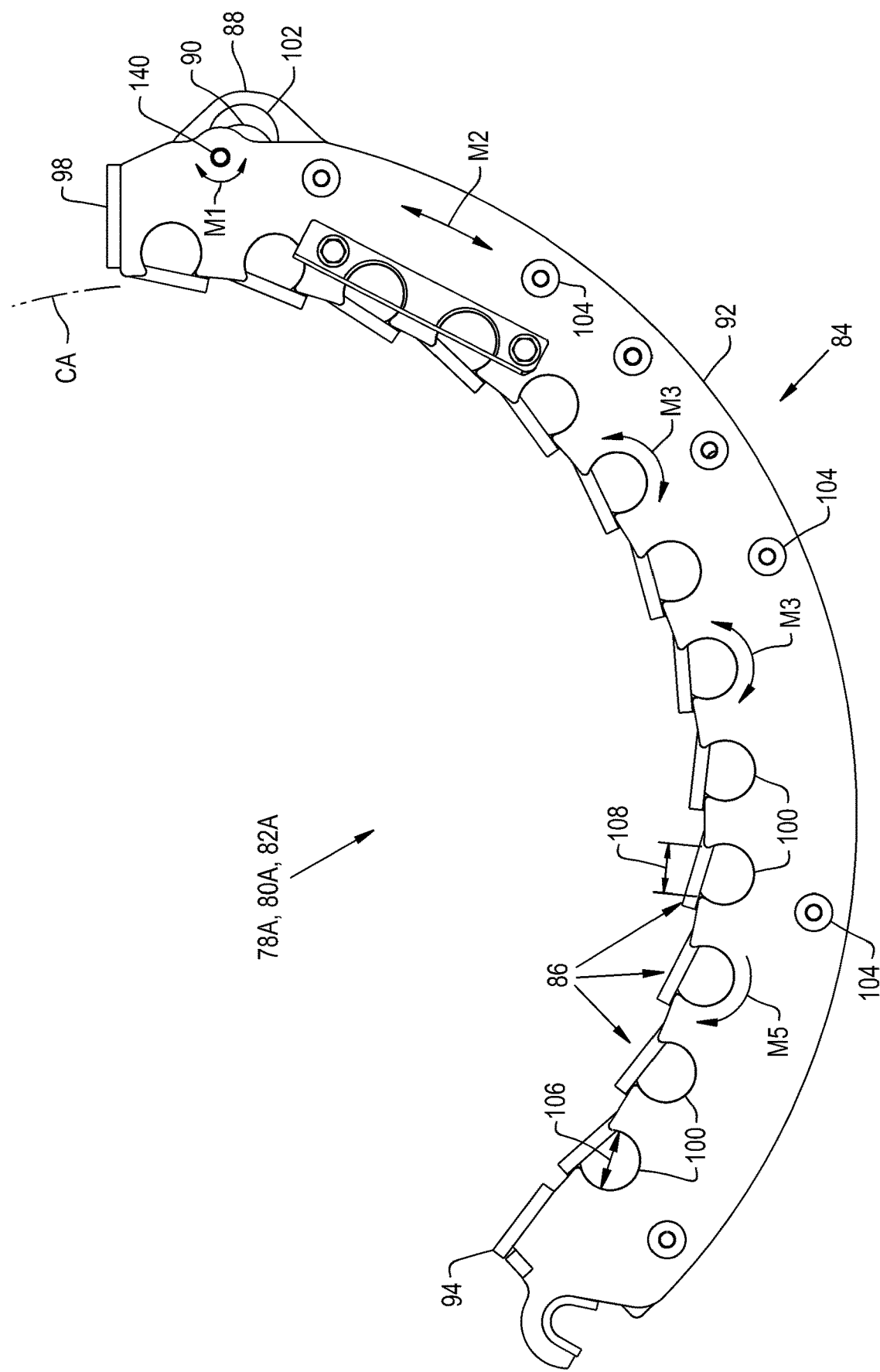
FIG. 9 is a front view of the concave of FIG. 8 with the pivotal finger members in the bar/wire position.

Now, additionally referring to FIGS. 8 and 9, there is illustrated the outward inclination of the fingers on the pivotal members 86 as a motion M5 is carried out by way of the actuator A1. The fingers are pivoted outward relative to their position as shown in FIG. 5. In FIG. 5 the inward facing surface of the pivotal members 86 are substantially aligned as a circumferential arc relative to axis RA. However, as seen in FIG. 9 the fingers are pivoted outward from the circumferential arc. This raises the backside of the fingers to thereby present a differing profile to the moving crop material.

Figure 10:
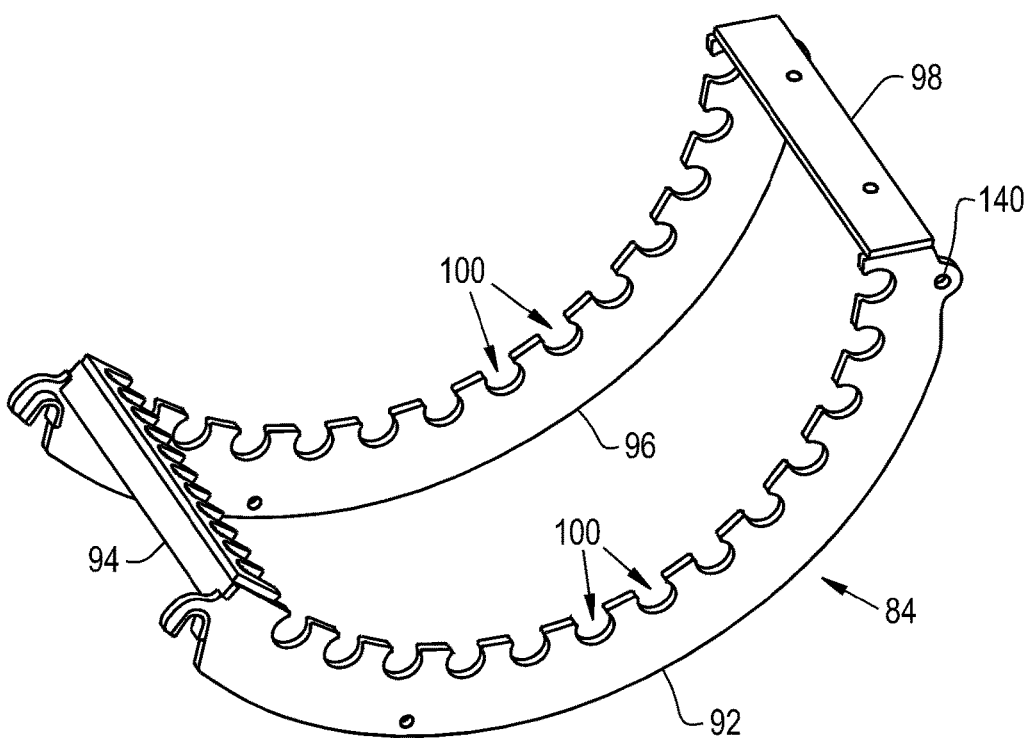
FIG. 10 is a perspective view of the frame of the concave of FIGS. 2-9.

Now, additionally referring to FIG. 10, there is illustrated the frame 84, which, as mentioned before, has sides 92, 94, 96 and 98 rigidly coupled together with sides 92 and 96 being generally the same as each other.

Figure 13:
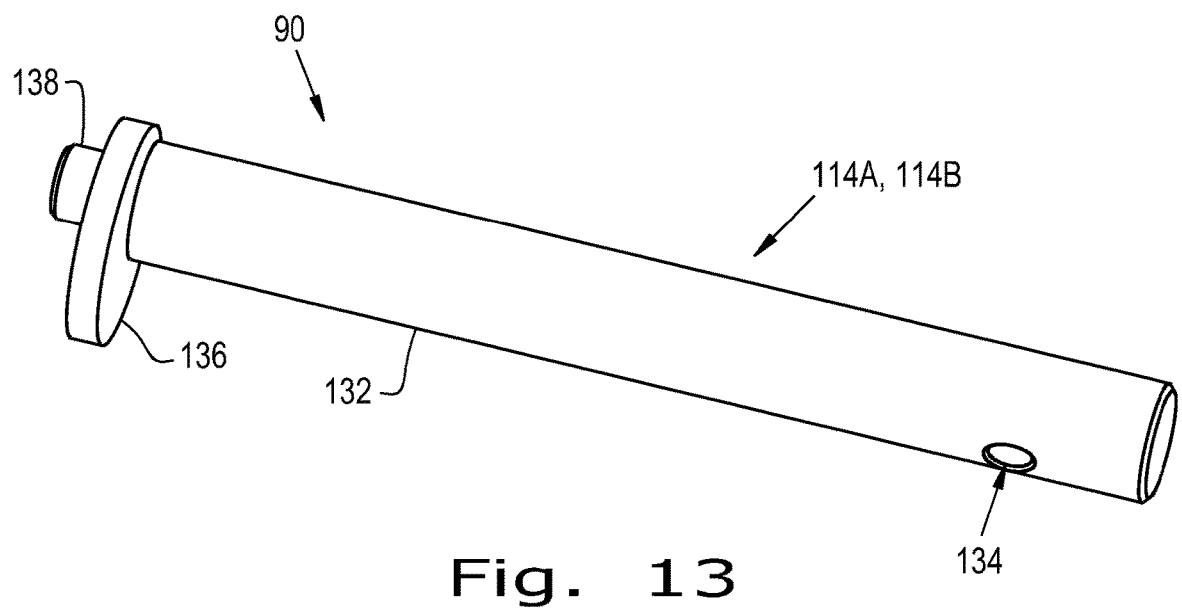
FIG. 13 is a perspective view of an eccentric bar that is part of the eccentric member used in the concave sections of FIGS. 2-9.

Further details of the pivotal members 86 are shown in FIG. 11, where fingers 118 are identified and a partially circular protrusion 120 is mirrored on each end of the pivotal member 86. Each protrusion 120 has a flat side 122 (although other profiles are also contemplated). Each protrusion 120 has a diameter 124 and the flat side 122 affords a distance 126 that is less than the diameter 124. The distance 126 is such that it allows protrusions 120 to pass through the breadth 108 of the slotted holes 100 when oriented such that the top surface of the fingers 118 are oriented generally toward axis RA. Once the pivotal member 86 is inserted into a corresponding set of slotted holes 100 on sides 92 and 96, then the pivotal member 86 is rotated in slotted holes 100 to thereby cause pivotal members 86 to be retained by frame 84, since once rotated the diameter 124, which is slightly less than diameter 106, is larger than breadth 108. Now, additionally referring to FIGS. 12 and 13, there is shown arcuate movable member 88 with toothed sections 110 and non-toothed sections 128 between each of the toothed sections 110. The eccentric bar 114A, 114B has a bar 132, a captivating feature 134, an eccentric 136 and a protrusion 138. The protrusion 138 fits into a hole 140 in the frame 84 allowing bar 114A, 114B to rotate as a member 90. The eccentric 136 in the form of a cam 136 sits in opening 102 and as the bar 90 is rotatively driven by the actuator A1 it causes motion M2 of the arcuate movable member 88.

The way that grate 78A, 80A, 82A is assembled is that the rigid frame 84 is positioned so that access is available along the concave side. The pivotal members 86 are then inserted into corresponding sets of the slotted holes 100. As discussed above the flat side 122 is aligned so that the protrusions 120 pass thorough the breadth 108, and then the pivotal members 86 are pivoted so that the fingers 118 are positioned so that they are similarly aligned, for example as shown in FIG. 5. Then the arcuate movable members 88 are positioned along the inside surfaces of sides 92 and 96 such that the toothed sections 110 are properly engaging with the toothed sections 112. Since the openings in the toothed section 110 corresponds to the number of teeth in the toothed sections 112 the arcuate movable members 88 have to be properly aligned or slots 130 will not align so that the retainers 104 can be inserted therethrough. Once the arcuate movable members 88 are aligned the retainers 104, which may be in the form of shoulder bolts 104, are inserted and fastened. Then the coupling 116 is slipped over the eccentric bar 114A and eccentric bars 114A and 114B are inserted into slots 102 with the protrusions 138 entering the corresponding holes 140 in the frame 84. The coupling 116 is then slid to engage the eccentric bar 114B and fasteners are used to secure the coupling 116 to the eccentric bars 114A and 114B. To disassemble grates 78A, 80A, 82A, a reverse procedure is utilized.

There is at least one arcuate movable member 88 that interacts with the plurality of pivotal members 86 to thereby pivot each of the pivotal members 86 as the arcuate movable member 88 is moved along a segment of an arc M2 generally about the rotational axis RA. Each of the pivotal members 86 have at least one toothed section coupled proximate an end of the pivotal member 86. The arcuate member 88 has a plurality of teeth 110 that engage and interact with the toothed sections 112 of each of the pivotal members 86. The plurality of teeth 110 on the arcuate member 88 are arranged to correspond with each of the toothed sections 112 of the pivotal members 86 as a series of toothed sections 110 separated by non-toothed sections 128 along the arcuate movable member 88. The arcuate moveable member 88 is constrained to move along one of the sides 92 or 96 of the frame 84.

There are two arcuate movable members 88 positioned on opposing sides 92, 96 of the frame 84. Each of the pivotal members 86 have two toothed sections 112 coupled proximate to opposite ends of the pivotal member 86. The eccentric member 90 is rotationally coupled to the frame 84, with the eccentric member 90 having an eccentric feature 136 that interacts with an opening 102 in the arcuate movable member 88 to move the arcuate movable member 88 as the eccentric member 90 rotates in the frame 84. The actuator A1 is coupled to the eccentric member 90 to controllably rotate the eccentric member 90 causing the arcuate movable member 88 to move that causes each of the pivotal members 86 to pivot. Each of the pivotal members 86 have a plurality of fingers 118 extending therefrom.

The actuator A1 controls the orientation of the fingers 118 so that they can extend inward from a circumferential arc CA relative to the rotational axis RA or outward from the circumferential arc CA. The frame 84 has a plurality of slotted holes 100 along two of the sides 92, 96 of the frame 84, with the pivoting members 86 being inserted into corresponding sets of the slotted holes 100 on each of the two sides 92, 96 of the frame 84, each of the slotted holes 100 has a slot that extends to an edge of the side 92, 96 with the slot having an opening 108 that is smaller than a diameter 106 of the slotted hole 100. The pivotal members 86 have at each end thereof a protrusion 120 with a circular portion that corresponds with the diameter 106 of the hole 100 and a flat portion 122 that narrows the breadth 126 of the protrusion 120 so as to allow the protrusions 120 to pass through the breadth 108 of slotted holes 100 when the pivotal members are being assembled to the frame 84.

The eccentric member 90 is two eccentric bars 114A, 114B each interacting with the opening 102 in opposite arcuate moveable members 88, the coupling member 116 being slid over the two inner ends of the eccentric bars 114A, 114B, the coupling member 116 being secured to each of the eccentric bars 114A, 114B to form the eccentric member 90.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A threshing system for use in an agricultural harvester, the threshing system comprising:
   a rotor for moving crop material through the threshing system, the rotor having a rotational axis; and
   a perforated concave system comprising perforations, the perforated concave system spaced radially outwardly from the rotor for passing grain through the perforations as the rotor moves the crop material across the concave system;
   wherein the concave system further comprises:
      at least one concave section having:
         a rigid frame having a plurality of sides rigidly coupled together;
         a plurality of pivotal members pivotally coupled to and extending to two of the sides of the rigid frame; and
         at least one arcuate movable member interacting with the plurality of pivotal members to pivot each of the pivotal members as the at least one arcuate movable member is moved along a segment of an arc generally about the rotational axis, wherein each of the pivotal members has at least one toothed section, wherein the at least one arcuate movable member has a plurality of teeth that engage and interact with the at least one toothed section of each of the pivotal members.

2. The threshing system of claim 1, wherein each at least one toothed section is coupled proximate an end of each pivotal member.

3. The threshing system of claim 1, wherein the plurality of teeth on the at least one arcuate movable member are arranged to correspond with each of the toothed sections of the pivotal members as a series of toothed sections separated by non-toothed sections along the at least one arcuate movable member.

4. The threshing system of claim 1, wherein the at least one arcuate movable member is constrained to move along one of the sides of the frame, one of the sides of the frame being parallel to another of the sides of the frame.

5. The threshing system of claim 4, wherein the at least one arcuate movable member is two arcuate movable members positioned respectively along parallel sides of the frame.

6. The threshing system of claim 1, wherein the at least one toothed section of each of the pivotal members is two toothed sections coupled proximate to opposite ends of each pivotal member.

7. The threshing system of claim 1, further comprising an eccentric member rotatably coupled to the frame, the eccentric member having an eccentric feature that interacts with an opening in the at least one arcuate movable member to move the at least one arcuate movable member as the eccentric member rotates in the frame.

8. The threshing system of claim 7, further comprising an actuator coupled to the eccentric member to controllably rotate the eccentric member causing the arcuate movable member to move to cause each of the pivotal members to pivot.

9. The threshing system of claim 8, wherein each of the pivotal members has a plurality of fingers extending therefrom.

10. The threshing system of claim 9, wherein the actuator controls an orientation of the fingers so that they can extend inward from a circumferential arc relative to the rotational axis or outward from the circumferential arc.

11. The threshing system of claim 1, wherein the rigid frame has a plurality of slotted holes along two of the sides of the frame, the pivotal members being inserted into corresponding sets of the slotted holes on each of the two sides of the frame, each of the slotted holes has a slot that extends to an edge of a side and that has an opening that is smaller than a diameter of the hole.

12. The threshing system of claim 11, wherein the pivotal members have at each end thereof a protrusion with a circular portion that corresponds with a diameter of the hole and a flat portion that narrows a breadth of the protrusion so as to allow the protrusions of the pivotal members to pass through the slots when the pivotal members are being assembled to the frame.

13. The threshing system of claim 7, further comprising a coupling member, the at least one arcuate movable member being two arcuate movable members, the eccentric member comprising two eccentric bars each interacting with an opening in respective ones of the two arcuate movable members, the coupling member being slid over two inner ends of the eccentric bars, the coupling member being secured to each of the eccentric bars to form the eccentric member.

14. A threshing system for use in an agricultural harvester, the threshing system comprising:
a rotor for moving crop material through the threshing system, the rotor having a rotational axis; and
a perforated concave system comprising perforations, the perforated concave system spaced radially outwardly from the rotor for passing grain through the perforations as the rotor moves the crop material across the concave system;
wherein the concave system further comprises:
at least one concave section having:
a rigid frame having a plurality of sides rigidly coupled together;
a plurality of pivotal members pivotally coupled to and extending to two of the sides of the rigid frame;
two arcuate movable members interacting with the plurality of pivotal members to pivot each of the pivotal members as the arcuate movable members are moved along a segment of an arc generally about the rotational axis;
an eccentric member rotatably coupled to the frame, the eccentric member having two eccentric bars that each interact with a respective opening in each of the arcuate movable members to move the arcuate movable members as the eccentric member rotates in the frame; and
a coupling member slid over two inner ends of the eccentric bars, the coupling member being secured to each of the eccentric bars to form the eccentric member.

15. The threshing system of claim 14, further comprising an actuator coupled to the eccentric member to controllably rotate the eccentric member causing the arcuate movable members to move to cause each of the pivotal members to pivot.

16. The threshing system of claim 15, wherein each of the pivotal members has a plurality of fingers extending therefrom.

17. The threshing system of claim 16, wherein the actuator controls an orientation of the fingers so that they can extend inward from a circumferential arc relative to the rotational axis or outward from the circumferential arc.

18. The threshing system of claim 14, wherein the arcuate moveable members are each constrained to move along a respective one of the sides of the frame, one of the sides of the frame being parallel to another of the sides of the frame.

19. The threshing system of claim 14, wherein the rigid frame has a plurality of slotted holes along two of the sides of the frame, the pivotal members being inserted into corresponding sets of the slotted holes on each of the two sides of the frame, each of the slotted holes has a slot that extends to an edge of a side and that has an opening that is smaller than a diameter of the hole.

20. The threshing system of claim 19, wherein the pivotal members have at each end thereof a protrusion with a circular portion that corresponds with a diameter of the hole and a flat portion that narrows a breadth of the protrusion so as to allow the protrusions of the pivotal members to pass through the slots when the pivotal members are being assembled to the frame.

* * * * *